Jan. 16, 1951 U. O. GUIGNARD 2,538,514
STACKER FOR TRACTORS
Filed Feb. 2, 1949 3 Sheets-Sheet 1
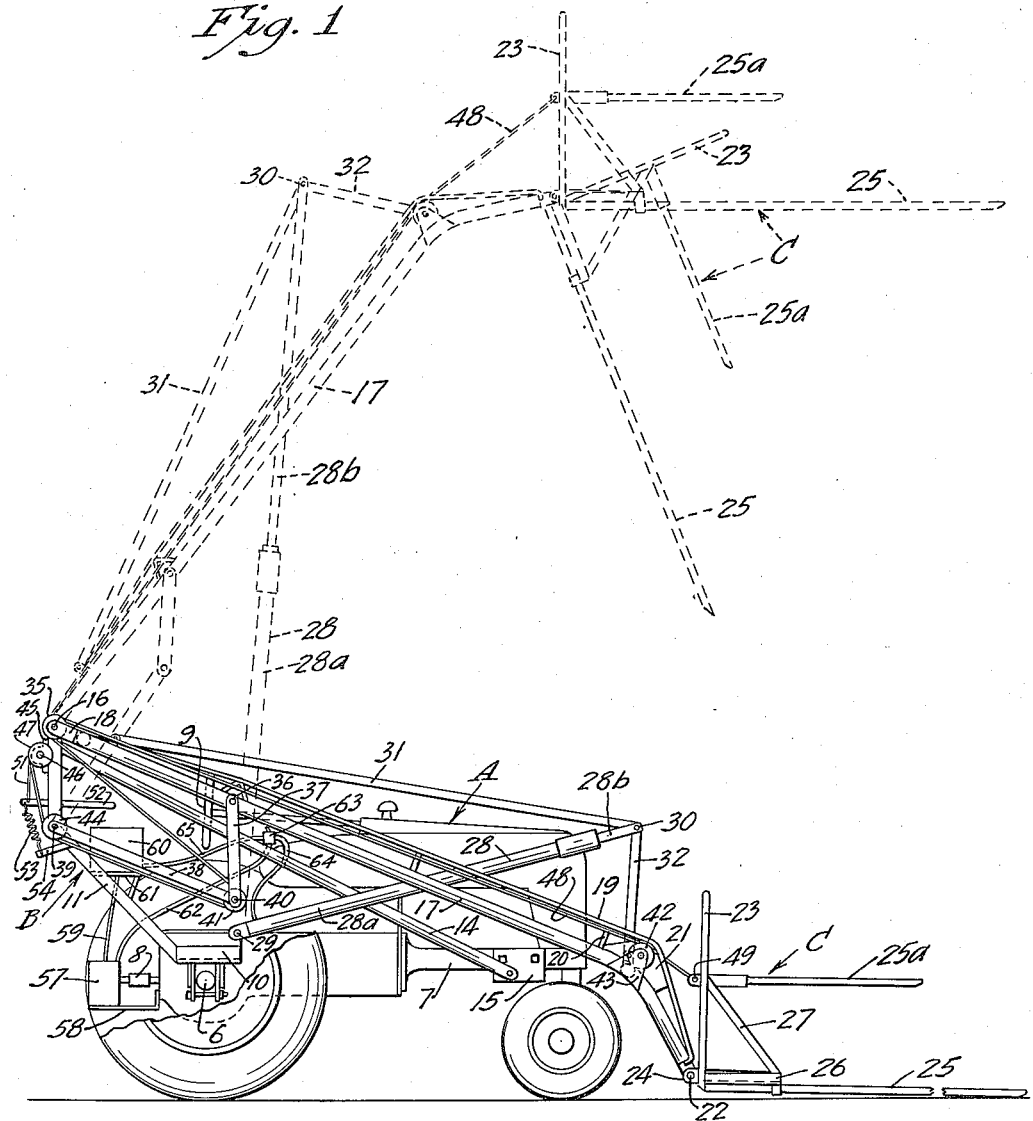
Fig. 1
Fig. 2
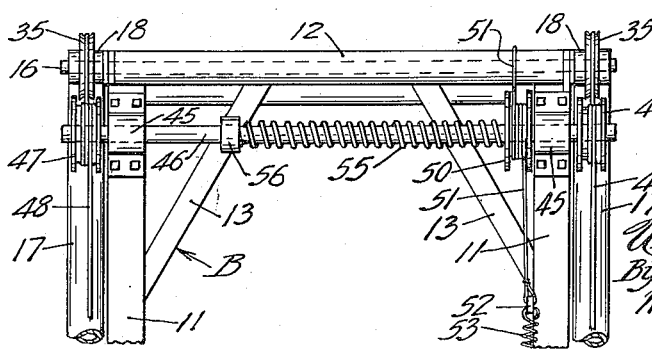
Inventor
Ulyss O. Guignard
By Williamson & Williamson
Attorneys

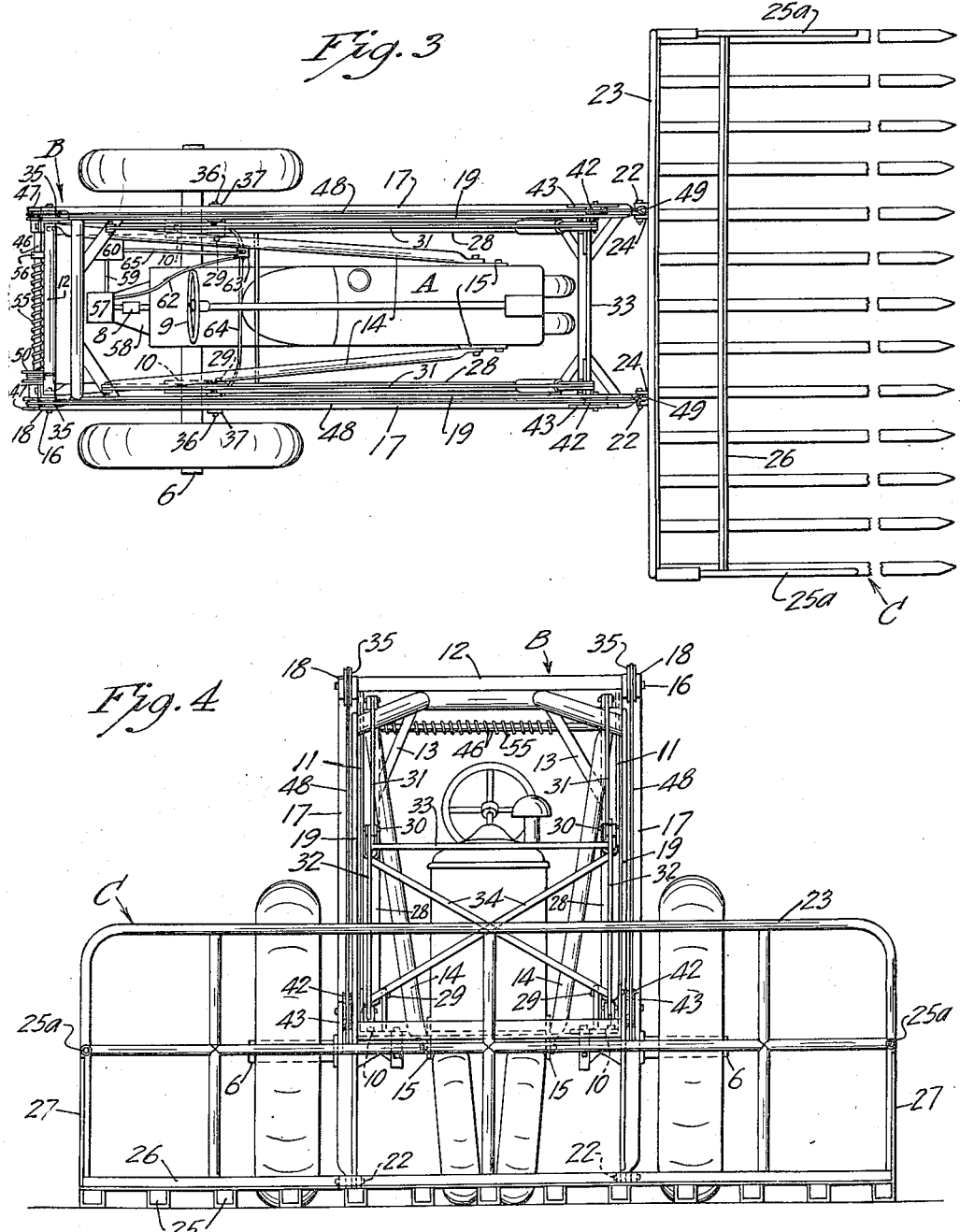

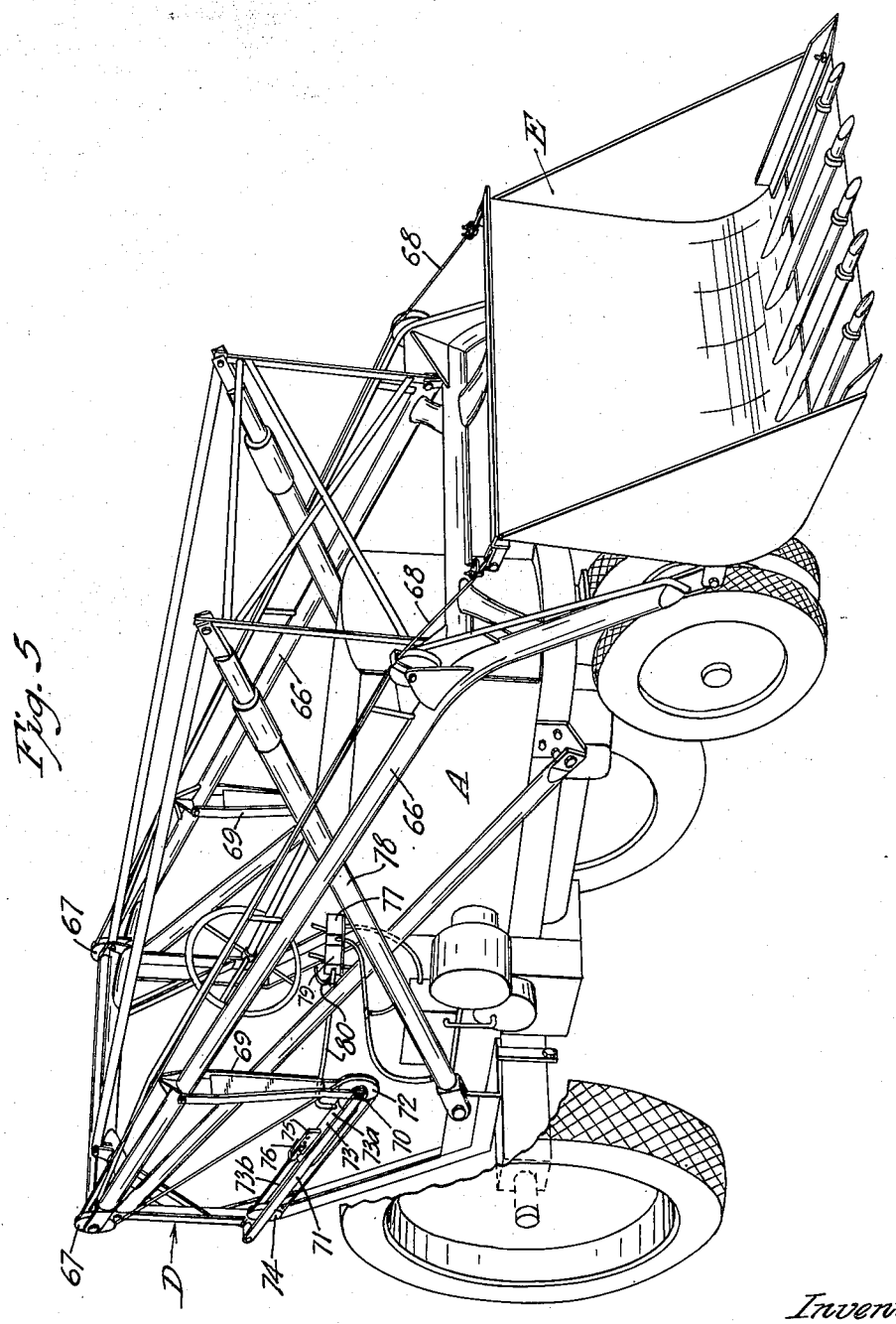

Patented Jan. 16, 1951

2,538,514

UNITED STATES PATENT OFFICE 2,538,514

STACKER FOR TRACTORS

Ulyss O. Guignard, Minneapolis, Minn.

Application February 2, 1949, Serial No. 74,128

5 Claims. (Cl. 214—140)

This invention relates to tractor mounted loaders. It is one of the objects of the invention to provide a leveling and dumping control for the load carriers of tractor mounted loaders which is of simple and inexpensive construction which will not project above or behind the booms of the loader and which can be effectively used for maintaining the load carrier in a substantially horizontal relation as the booms are raised from a position adjacent the ground to an upper position and which will permit ready dumping of the load carrier when the booms are in the raised position under the control of the operator.

Another object is to provide a novel and improved front end loader including side booms and hydraulic jacks for raising and lowering the booms, the booms being so made that they can be raised from a position adjacent the ground to a high elevation and the application of power from the jacks being such that as the jacks are extended when the booms are in lowered position, substantial moments of force exerted by the jacks will be in an upward direction.

The objects and advantages of the invention will more fully appear from the following description made in connection with the accompanying drawings wherein like reference characters refer to the same or similar parts throughout the different views, and in which Fig. 1 is a view in side elevation illustrating a loader embodying the invention applied to a tractor, the parts being shown in full lines with the load carrier lowered and being shown in dotted lines with the load carrier raised, and the load carrier in raised position being shown in two positions, a non-dumping position and a dumping position;

Fig. 2 is a view in rear elevation in enlarged scale looking toward the rear upper portion of the loader structure;

Fig. 3 is a plan view of the loader applied to the tractor;

Fig. 4 is a view in front elevation of the loader applied to the tractor; and

Fig. 5 is a perspective view illustrating a slightly different embodiment of the invention applied to a tractor.

Referring first to Figs. 1 to 4 inclusive, a tractor A is shown including a rear axle housing 6, a front frame extension 7, a power take-off shaft 8, and a steering wheel 9.

In accordance with the invention, there are provided, one at each side of the tractor, two clamping brackets 10 of such a type as to fit the axle housing 6 between the driving wheels of the tractor and the main body of the tractor, and these brackets are clamped to the axle housing at these points. Fixed to the brackets 10 and projecting first diagonally upwardly and rearwardly therefrom and then vertically upwardly are a pair of bars 11 interconnected at their upper ends by a cross tube 12, suitable diagonal braces 13 extending between the bars 11 and the tube 12. The cross tube 12 is firmly anchored in position by diagonal brace bars 14 which are connected at their rear ends to the tube 12 and project downwardly and forwardly and are connected to plates 15 attached to forward portions of the frame 7 at the two sides of the tractor. The brackets 10, the bars 11, the tube 12, the diagonal braces 13, and the brace bars 14 form a strong frame designated as an entirety by the letter B upstanding from the rear portion of the tractor to carry the rear ends of the side booms of the loader.

A cross shaft 16 is journaled in the cross tube 12 and pivotally connected to this cross shaft 16 are a pair of side booms 17 carrying forks 18 at their rear ends journaled on the shaft 16. The booms 17 when in their downwardly swung position project diagonally downwardly and forwardly from the cross tube 12 and they are provided with forward portions which project diagonally downwardly and forwardly at a steeper angle ahead of the front end of the tractor A. To strengthen these booms 17 while still providing a relatively light construction, each boom is provided with a truss rod 19 connected at its two ends to the end portions of the boom to which it is applied and spaced upwardly therefrom by a plurality of struts 20 and running over and secured to upstanding plates 21 located immediately forward of the forward end of the tractor when the booms are in their downwardly swung position. With this construction, it will be seen that each boom 17 is very strongly trussed.

Any one of a number of different types of load carriers such as the hay sweep C illustrated may be pivotally connected by pivots 22 to the lower ends of the two booms 17. The particular load carrier C illustrated includes a back frame 23 carrying at its lower end a pair of apertured lugs 24 connected by the pivots 22 to the booms, and the carrier C also includes a number of forwardly projecting bottom tines 25 connected together by a cross bar 26 in forwardly spaced relation from the back frame 23. The back frame 23 also in upwardly spaced relation from the tines 25 carries a pair of side tines 25a, and diagonal braces 27 run between the sides of the frame 23 and the outermost bottom tines 25.

To swing the booms 17 from the lowered position shown in full lines Fig. 1 upwardly to any desired level up to the level of the dotted position shown in Fig. 1 there are provided a pair of extensible hydraulic jacks 28 and one member of each jack, such as the cylinder member 28a, is connected by a pivot 29 to a bracket 10, and the other member of the jack, such as the extensible member 28b, is connected by a pivot 30 to the interconnected ends of a pair of links 31 and 32. The links 31 are connected at their rear ends to the booms 17 and run forwardly from their rear ends to connect with the links 32 above the booms 17 and the links 32 are connected at their lower ends to the booms 17 forwardly of the tractor when the booms are lowered and these links 32 run upwardly from the booms to connect with the links 31. The links 32 are in turn cross connected by a cross bar 33 and by diagonal cross braces 34 to give the structure adequate strength and to maintain the pivot 30 in proper alignment relative to the jacks 28 and the booms 17. It will be seen that the links 31 and 32 at each side of the structure form two sides of a triangle, the third side being formed by a portion of the boom 17, and the apex of this triangle where the pivot 30 is located is disposed well above the level of the boom 17 when the boom is in downwardly swung position. Accordingly, assuming that the booms 17 are in downwardly swung position, as the jacks 28 are extended, a strong moment of force applied by the jacks will be in an upward direction which will cause any load carried by the load carrier C to be easily raised from the ground during the initial raising movement of the booms 17.

Pivotally mounted on the cross shaft 16 between the forks 18 carried by the booms 17 are sheaves 35, these sheaves in effect being carried by the rear ends of the booms 17 and by the upper portions of the frame B. Connected by pivots 36 to the booms 17 forwardly from their rear ends are downwardly extending links 37. Cooperating links 38 are pivotally connected by pivots 39 at their rear ends to the bars 11 of the frame in downwardly spaced relation from the shaft 16 about which the booms 17 swing, and these links 38 are in turn connected at their forward ends to the lower ends of the links 37 by pivots 40 on which sheaves 41 are journaled. The links 38 are preferably disposed in approximate parallelism with the rearward portions of the booms 17 and it is preferable but not entirely necessary that the links 37 be disposed in parallelism with the vertical portions of the bars 11 when booms 17 are in lowered position as shown in full lines Fig. 1. Other sheaves 42 are carried by brackets 43 mounted on the booms 17 located just forward of the tractor when the booms are in downwardly swung position, while other sheaves 44 are mounted on the pivots 39 which connect the rear ends of the links 38 to the bars 11 of the frame A. Mounted in suitable bearings 45 attached to the rear sides of the bars 11 near their upper ends is a drum shaft 46 carrying adjacent its two ends in alignment with the pulleys 35 a pair of winding drums 47. Cables 48 are secured at their forward ends to the carrier C above the pivots 22 on which the carrier may swing on the booms 17 and for the purpose of connecting the cables 48 to the carrier C illustrated the back frame 23 of the carrier is equipped with eyes 49 in alignment with the sheaves 42 and the forward ends of the cables 48 are attached to these eyes 49. From their forward ends the cables 48 run rearwardly first over the sheaves 42, thence rearwardly over the sheaves 35, thence diagonally downwardly and forwardly over the sheaves 41, thence rearwardly over the sheaves 44 and the rear ends of these cables are secured to the winding drums 47 and normally rear portions of the cables are wound on these drums.

The drum shaft 46 inwardly from one of the bars 45 carries a spool 50 forming a nigger head. A short cable 51 is anchored at one end to the cross tube 12 and is wound several times around the nigger head 50 and the remaining end of this cable is attached to the rear end of a control lever 52 pivotally carried by the adjacent bar 11. A coiled tension spring 53 is connected at one end to the rear end of the lever 52 and is connected at its other end to an arm 54 attached to and projecting rearwardly from the adjacent bar 11. Of course, the spool 50 forming the nigger head is fixed to the shaft 46 to rotate therewith and this nigger head together with the cable 51, the spring 53, the lever 52, and the arm 54 form a brake which will control rotation of the shaft 46 and the winding drums 47 secured thereto. The lever 52 runs forwardly to a point adjacent the steering wheel 9 so that it can be readily grasped by the tractor operator, and by pressing downwardly on the forward portion of the lever 52 the cable 51 may be slackened around the spool 50 to allow the nigger head to slip relative to the cable permitting the shaft 46 to rotate. The spring 53 when the lever 52 is released will have enough power due to the wrapping of the cable 51 around the spool 50 to hold the wraps of the cable 51 tightly on the nigger head 50 and thus prevent rotation of the shaft 46.

A coil spring 55 surrounds a portion of the drum shaft 46 and this spring is connected at one end to one side of the nigger head 50 and is connected at its other end to a collar 56 carried conveniently as by one of the diagonal braces 13 of the frame B. The spring 55 is normally under tension to cause the drum shaft 46 to turn in a clockwise direction as viewed in Fig. 1 tending to cause portions of the cables 48 to be wound on the winding drums 47.

A suitable hydraulic pump 57 is provided carried as by a bracket 58 attached to the rear part of the tractor A. A power take-off shaft 8 of the tractor runs into this pump and drives the same. The pump 57 in turn is connected by a supply conduit 59 to a liquid reservoir 60 mounted by a suitable bracket 61 to the rear portion of the tractor as above the level of the pump 57. A supply conduit 62 runs from the discharge outlet of the pump 57 to a valve 63 supported within easy reach of the driver of the tractor and controlling flow through a conduit 64 having branches running to the hydraulic cylinders 28a of the hydraulic jacks 28. Return flow conduits 65 run from the valve 63 back to the reservoir 60. The details of this hydraulic system are not illustrated but it will be understood that when the valve 63 is located in one position fluid will be drawn by the pump 57 from the reservoir 60 through the conduit 59 and supplied through the conduit 62, valve 63, and conduit 64 to the two cylinders 28a of the two jacks 28 causing extension of the jacks. In a second position of the valve 63 the flow from the valve to the cylinders 28a will be cut off and the fluid supplied from the pump through the conduit 62 may be bypassed through the conduit 65 back to the reservoir 60. In a third position of the valve 63 backflow from the cylinders 28a of the hydraulic jacks 28 will be permitted through the conduits 64 to the valve 63 while the fluid is being bypassed from the conduit through the valve 63 back through the conduit 65 to the reservoir 60.

Assuming that the booms 17 of the loader are lowered as shown in full lines Fig. 1 and in Figs. 3 and 4, that rear end portions of the cables 48 are wound on the drums 47, and that the drum shaft 46 is held from rotation by the brake afforded by the spool 50, cable 51, lever 52, and spring 53, the device is ready for use. If the particular carrier C illustrated is mounted on the booms 17 and hay is to be stacked by the loader, the tractor will be driven forwardly to carry the carrier into the hay until a load is received by the carrier C. Thereupon, if desired, the valve 63 may be turned to a position to supply a small quantity of fluid to the hydraulic jacks 28 causing extension of these jacks slightly, whereupon the valve 63 will be swung to a second position to close off communication between the hydraulic jacks and both the supply conduit 62 and the return conduit 65 allowing the fluid being pumped by the pump 57 to bypass back to the reservoir 60. As a small quantity of fluid is initially supplied to the cylinders 28a of the jacks 28 the jacks will extend and the booms 17 will be raised slightly thereby lifting the carrier C above the ground level. The tractor with the booms 17 still in lowered position may be then driven to the point where it is desired to dump the hay, whereupon through further operation of the valve 63 additional fluid may be supplied to the cylinders 28a of the jacks, causing the booms 17 to raise from their lowered position to their upper position. Raising movement of the booms can be stopped at any desired level through actuation of the valve 63 and the booms can be held at this desired level.

As the booms 17 raise from their lowered position upwardly the spacing between the sheaves 41 and the sheaves 35 will decrease due to the linkage afforded by the links 37 and 38. This decrease in the spacing between the sheaves 41 and 35 is sufficient to gradually pay out a slightly greater length of the cables 48 between the sheaves 35 and the eyes 49 of the carrier C to which the forward ends of the cables are connected and accordingly the bottom of the carrier formed by the tines 25 may be maintained in substantially a horizontal plane during the raising of the booms 17. It is, of course, possible to vary the length of the links 37 and 38 so that if it is desired to slightly tip up the forward portion of the carrier C during the raising movement so as to prevent the possibility of portions of the load dropping from the carrier, this can be accomplished while the angle between the forward end portions of the booms 17 and the bottom of the carrier formed by the tines 25 is steadily increased.

When now the booms 17 have been raised to the height desired for dumping of the carrier C and it is desired to dump the carrier, the operator of the tractor will grasp the forward end of the lever 52 and push it downwardly against tension of the spring 53, thereby loosening the cable 51 slightly on the nigger head 50 and allowing the nigger head and the shaft 46 to turn against the tension of the spring 55, the weight of the load on the carrier being sufficient to overcome the tension of this spring. The cables 48 may now lengthen between the sheaves 35 and the connection of these cables to the carrier C and the carrier will swing down from the uppermost dotted line position shown in Fig. 1 to the lower dotted line position, thereby permitting dumping of the load. The booms 17 are then lowered and as the carrier C strikes the ground the weight of the carrier on the cables 48 is relieved and due to the direction of winding of cable 51 on the nigger head 50 the spring 55 will cause rear portions of the cable to be again wound on the drums 47 without pressing lever 52 downwardly, whereupon the device is ready for further use.

Referring now to Fig. 5, there is there shown a slightly different embodiment of the invention which differs principally from the described embodiment in respect to the dumping control mechanism. It will thus be unnecessary to describe all the parts in detail. The device as shown in Fig. 5 includes a rear frame D substantially similar to the frame B previously described. It includes booms 66 similar to the booms previously described and carrying sheaves 67 similar to the sheaves 35. An alternative form of carrier E is shown on the device illustrated in Fig. 5, but this carrier is pivotally connected to the booms 66 in generally a similar manner to the carrier C, and cables 68 are employed which are connected to the rear portions of the carrier E above the point of pivotal connection to the booms 66. These cables run rearwardly over the sheaves 67. Pivotally connected to the booms 66 forwardly from the pivots on which the booms swing are downwardly extending links 69 connected by pivots 70 at their lower ends to links 71 pivotally connected at their rear ends to the frame D below the pivotal axis on which the booms 66 swing. The pivots 70 carry sheaves 72, and it will be seen that as the booms 66 are raised, the spacing between the sheaves 72 and the sheaves 67 will decrease while as the booms 66 are lowered, the spacing between these sheaves will increase. Fixed as to the links 71 are hydraulic cylinders 73a of hydraulic jacks 73, and the extensible members 73b of these jacks run rearwardly and carry at their rear ends sheaves 74. The cylinders 73a also carry upstanding lugs 75 equipped with a plurality of spaced openings to any one of which cable connectors 76 may be connected. The cables 68 after passing over the sheaves 67 run forwardly over the sheaves 72, thence rearwardly over the sheaves 74 and the rear ends of the cables are connected to the cable connectors 76 anchored on the cylinders 73a of the jacks 73. Suitable fluid connections are made between a first valve 77 which controls the flow of fluid to the main jacks 78 which operate the booms 66, to a second valve 79 and fluid conduit 80 running to the cylinders 73a of the jacks 73 to supply fluid to these last named jacks.

With the arrangement shown in Fig. 5 the booms 66 may operate as previously described. The jacks 73 having been previously extended before the booms 66 are raised to dumping position, when now it is desired to dump the load from the carrier E, it is merely necessary to operate the valve 79 to allow the fluid from the cylinders 73a of the jacks 73 to flow back to the reservoir, whereupon the length of the cables 68 between the sheaves 67 and their connections with the carrier E will be allowed to increase permitting dumping of the carrier. After the dumping operation the valve 79 may be operated to supply fluid to the cylinders 73a of the jacks 73, thereby extending these jacks and returning the carrier E to the non-dumping position. Due to the fact that the cables 68 travel rearwardly from the sheaves 72 over the sheaves 74 and thence forwardly to the point where the cables are anchored on the lugs 75, hydraulic jacks 73 may be employed which have comparatively short extension and yet the cables 68 may be slackened enough when desired to permit the dumping operation.

It will be seen that highly effective tractor mounted loader constructions have been provided including leveling and dumping controls for the carrier which will permit the booms to be raised to a high level and which will not project above the booms or rearwardly from the booms to be in the way of operations. It will also be seen that due to the overhead support of the forward portions of the booms by the main hydraulic jacks the load can be readily lifted from the ground during the initial part of the upward swinging movement of the booms with an expenditure of relatively low power.

It will of course, be understood that various changes may be made in the form, details, arrangement, and proportions of the various parts without departure from the scope of the present invention, which, generally stated, consists in the matter shown, and described, and set forth in the appended claims.

What is claimed is:

1. In a tractor mounted loader having a rear frame, side booms pivoted thereto at their rear ends, means for raising and lowering the forward portions of the booms, and a load carrier pivotally supported at forward portions of the booms, a leveling and dumping control for the carrier comprising a sheave carried by said frame for rotation about the pivotal axis of said booms, a second sheave, means mounting said second sheave relative to said booms and said first sheave in such relation that as the booms are raised the spacing between the said two sheaves will decrease and as said booms are lowered the spacing between said two sheaves will increase, a cable attached at its forward end to said carrier above the point of pivotal connection of the carrier with said booms, said cable running rearwardly over said two sheaves, a winding drum mounted for rotation on said frame, the rear end of said cable being attached to said winding drum for winding of a portion of the cable thereupon, a brake normally holding said winding drum against rotation but capable of release to permit paying out of the cable from said winding drum to permit dumping of the carrier, and a spring normally urging said drum to wind portions of the cable thereon, said brake including a spool mounted for rotation with said drum, a cable anchored at one end to said frame wound several times around said spool, a lever pivotally connected to said frame and to one end of which the remaining end of said last mentioned cable is connected, and resilient means urging said lever to move the portion of the last mentioned cable connected thereto away from said spool.

2. In a tractor mounted loader having a rear frame, side booms pivoted thereto at their rear ends, means for raising and lowering the forward portions of the booms, and a load carrier pivotally supported at forward portions of the booms, a leveling and dumping control for the carrier comprising a first sheave pivoted on one of the booms, a pair of links having adjacent ends pivotally connected, a second sheave carried by said links at their point of pivotal connection, one of said links being pivotally connected to a boom forward of its pivotal connection to said frame, and the other link being pivotally connected to said frame in downwardly spaced relation from the pivotal connection of the boom to the frame, a cable attached at its forward end to said carrier above its point of pivotal connection to said booms, said cable running rearwardly over said two sheaves, a drum mounted for rotation on said frame and to which the rear end of said cable is attached after passing over said two sheaves, said drum capable of winding a portion of the cable thereon, a spring urging said drum to wind a portion of the cable thereon, and a brake controlling rotation of said drum, and a brake release permitting a portion of the cable to be unwound from the drum to permit dumping of the carrier, said drum including a drum shaft and said spring being a coil spring encircling the drum shaft connected at one end for movement with the drum and fixed at its other end.

3. In a tractor mounted loader having a rear frame, side booms pivoted thereto at their rear ends, means for raising and lowering the forward portions of the booms, and a load carrier pivotally supported at forward portions of the booms, a leveling and dumping control for the carrier comprising a pair of sheaves located respectively at the two sides of said frame and mounted for rotation about the pivotal axis about which the booms swing, a pair of links for each boom, the links of a pair being pivotally connected, and one link of a pair being pivotally connected to its boom forward of the point where the boom is pivotally connected to the frame, and the remaining link of the pair being pivotally connected to the frame in downwardly spaced relation from the pivotal connection of the boom with the frame, a sheave carried by each pair of links at their point of pivotal interconnection, cables attached at their forward ends to said carrier above the pivotal connection of the carrier with said booms, each cable running rearwardly over the two sheaves at one side of the frame, a drum shaft journaled on said frame, a pair of drums carried by said drum shaft and to which the rear ends of said cables are respectively connected for wind-up of rear portions of the cables on these drums, resilient means urging said drum shaft to wind portions of the cables thereon and a brake controlling rotation of said drum shaft to release portions of the cables wound on said drums and allow dumping of the carrier.

4. In a tractor mounted loader having a rear frame, side booms pivoted thereto at their rear ends, means for raising and lowering forward portions of the booms, and a load carrier pivotally supported at forward portions of the booms, a leveling and dumping control for the carrier comprising a first sheave pivoted on one of the booms, a second sheave, means mounting said second sheave relative to said booms and said first sheave in such relation that as the booms are raised the space between said two sheaves will decrease and as said booms are lowered the space between said two sheaves will increase, a cable attached at its forward end to said carrier above the point of pivotal connection of the carrier with said booms, said cable running rearwardly over said two sheaves, anchoring means for the rear end of said cable after passing over said two sheaves, a fluid operated jack including a fixed member and an extensible member, a sheave carried by said extensible member and over which said cable passes, said jack being mounted in such relation to said cable that as said jack is extended, the forward portion of said cable will be drawn rearwardly and as said jack is distended, the forward portion of said cable will be allowed to swing with said carrier downwardly, and means for extending and distending said jack.

5. In a tractor mounted loader having a rear frame, side booms pivoted thereto at their rear ends, means for raising and lowering the forward portions of the booms and a load carrier pivotally supported at forward portions of the booms, a leveling and dumping control for the carrier comprising a first sheave pivoted on one of the booms at its point of pivotal connection to said frame, a pair of links pivotally connected, one of which links is pivotally connected to one of the booms forwardly of the pivotal connection of the boom to the frame, and the other of which link is pivotally connected to said frame below the point of pivotal connection of the booms to the frame, a second sheave carried by said links at the point where the links are pivotally connected, a hydraulic jack having a fixed portion attached to one of said links and an extensible portion, a sheave carried by the extensible portion of said jack, said cable after passing over said two first mentioned sheaves running over said last mentioned sheave, and an anchor fixed relative to the fixed portion of said jack and to which the rear end of said cable is secured.

ULYSS O. GUIGNARD.

REFERENCES CITED

The following references are of record in the file of this patent:

UNITED STATES PATENTS

| Number | Name | Date |
|---|---|---|
| 2,412,412 | Meili | Dec. 10, 1946 |
| 2,418,403 | Grabske | Apr. 1, 1947 |
| 2,427,461 | Johnson | Sept. 16, 1947 |
| 2,441,310 | Coldwell et al. | May 11, 1948 |
| 2,457,049 | Lacey | Dec. 21, 1948 |
| 2,458,195 | Pearse | Jan. 4, 1949 |